April 28, 1931.   F. MESINGER   1,803,029
VEHICLE SADDLE
Filed Jan. 31, 1930
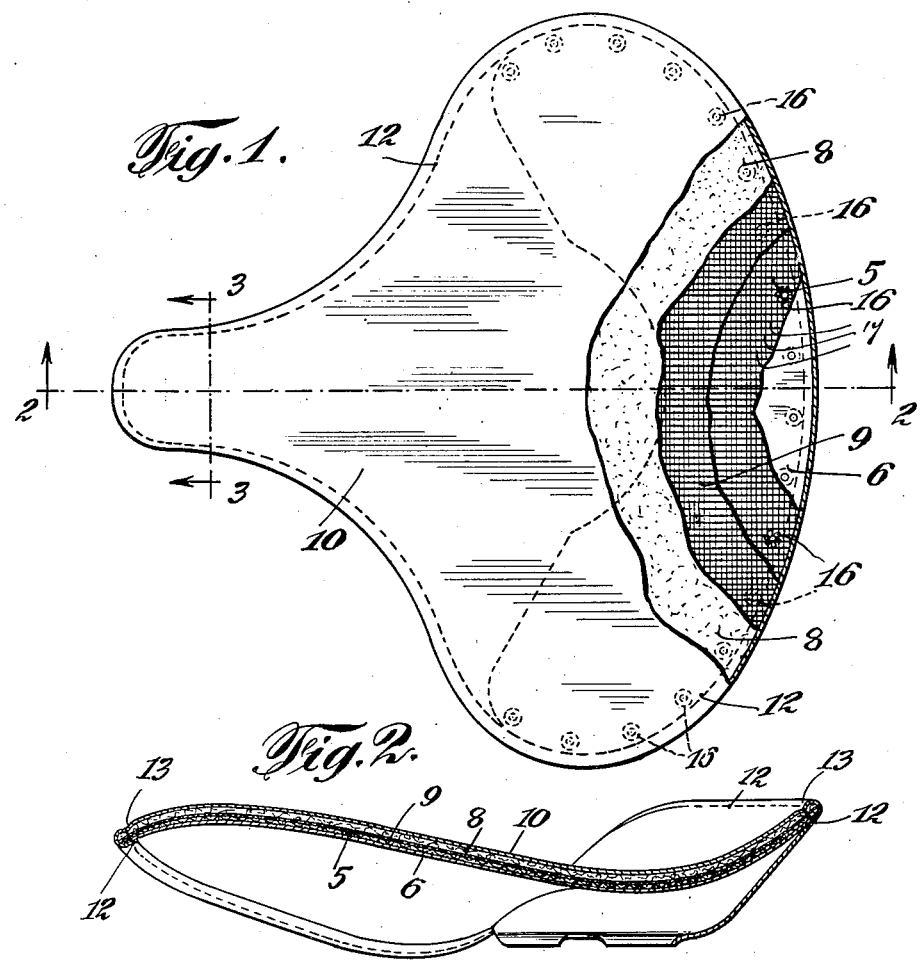
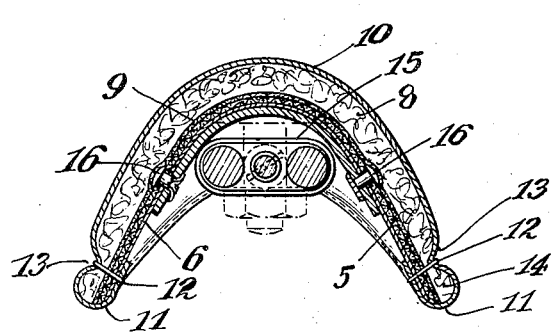
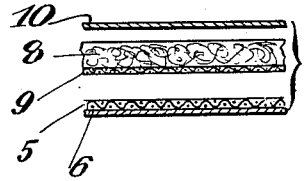
INVENTOR
Frederick Mesinger
BY
his ATTORNEY Patented Apr. 28, 1931

1,803,029

UNITED STATES PATENT OFFICE

FREDERICK MESINGER, OF MOUNT VERNON, NEW YORK

VEHICLE SADDLE

Application filed January 31, 1930. Serial No. 424,758.

This invention relates to vehicle saddles, and particularly to saddles for motorcycles and bicycles, the general object and purpose of my present improvements being to provide a saddle of this type having a simple, durable and inexpensive top structure affording a maximum degree of physical comfort to the rider and which would permit of a very low saddle position relative to the vehicle pedals for the accommodation of persons having short legs.

It is a more particular object of the invention to provide a saddle top embodying a base structure composed essentially of fibrous materials and which will retain an accurately fashioned or molded shape in general conformity with the anatomy of the rider, together with a comparatively thin layer of cushioning material of uniform thickness superimposed upon and entirely covering the upper surface of the saddle base and a top sheet of leather extending over the cushioning material and having its marginal edges turned inwardly under the edges of the saddle base and secured thereto and to the cushioning material by a continuous line of stitching. In this manner, it is my aim and purpose to produce a saddle top which will remain indefinitely in a soft and pliable condition. To this end, I preferably form the base structure of the saddle top as a molded or preshaped unit embodying adhesively united layers of textile fabric and water-proofing material, the layer or layers of fabric having their warp strands extending longitudinally of the saddle while the weft strands extend across or transversely of the saddle structure. I have found that this construction materially adds to the flexibility of the saddle top without sacrifice of durability, and also renders the inwardly curved side edge portions of the saddle top adjacent to the pommel soft and pliable. In the preferred embodiment of the invention, I preferably secure to the upper surface of the preformed base structure of the saddle by means of rubber cement, a thin sheet or layer of sponge rubber or other cushioning material, and finally cover said cushioning material with a top sheet of leather, and then permanently secure the several layers together adjacent the marginal edge of the saddle top.

It is a further general object of my invention to provide a highly serviceable saddle structure of the above character, the several parts of which may be easily and quickly assembled, whereby such saddles can be very rapidly manufactured at comparatively low cost.

With the above and other objects in view, the invention consists in the improved vehicle saddle and the method of producing the same, as will be hereinafter more fully described, illustrated in the accompanying drawings, and subsequently incorporated in the subjoined claims.

In the drawing, wherein I have illustrated one simple and practical embodiment of the invention, and in which similar reference characters designate corresponding parts throughout the several views,—

Figure 1 is a top plan view of a vehicle saddle constructed in accordance with one embodiment of my invention, parts thereof being broken away;

Fig. 2 is a longitudinal sectional view taken on the line 2—2 of Fig. 1;

Fig. 3 is a transverse sectional view taken on the line 3—3 of Fig. 1, and

Fig. 4 is a detail fragmentary section showing the base structure of the saddle top with the layer of cushioning material and the leather top sheet before final assemblage.

Referring in detail to the drawings, the saddle top as shown in Fig. 1 thereof, in plan has an outline contour generally similar to saddles as now widely used on motorcycles and other similar wheeled vehicles. The saddle top which is flexible and generally shaped in conformity with the anatomy of the rider, is secured in the usual way at its rear wider end to the customary cantle plate and at its forward pommel end to the usual pommel plate. To these pommel and cantle plates, any conventional means is attached for the purpose of mounting the saddle top on the vehicle frame. Since my present invention is concerned only with the saddle top itself, such means for mounting the saddle is not herein illustrated or described in detail.

Referring now to Figs. 2 and 4 of the drawings, it will be seen that the saddle top includes a base structure which consists of a sheet or layer of heavy textile fabric 5, such as sail cloth. This fabric or canvas sheet is cut to the requisite predetermined size and shape and to the lower surface thereof, a thin sheet of water proofing material 6 of similar size and shape is adhesively secured by means of glue. These two base sheets of the saddle structure are thus permanently united to each other by the interposed film of glue in a suitable mold whereby pressure is applied to properly shape or form said base sheets to the final longitudinal and cross sectional shape of the saddle, as shown in Figs. 2 and 3 of the drawings. The glue upon setting or drying, holds or retains said base sheets in their molded form.

From reference to Fig. 1 of the drawings, it will be observed that the warp threads of the heavy textile fabric sheet 5, as indicated at 7 extend longitudinally of the saddle, while the weft threads of said fabric extend at right angles thereto or across the saddle structure. By the arrangement of the warp threads longitudinally of the saddle, greater flexibility is obtained in the base of the saddle top, insuring a greater degree of comfort to the rider.

Upon the pre-formed or shaped base structure of the saddle top, a cushioning material is arranged. As herein shown, this cushioning material preferably consists of a comparatively thin layer of sponge rubber as shown at 8 which is of uniform thickness throughout its area, and which I have found by actual tests, need not exceed $\frac{3}{16}$ of an inch in thickness. This sheet of cushioning material is cut to such size and shape that when placed upon the saddle base, it will entirely cover the upper surface thereof and extend to the extreme marginal edges of said base. Preferably, I face the lower surface of the cushioning sheet 8 with a thin layer of water proofing material 9, such as may be procured under the trade name "Rubberoid." The layer of cushioning material 8 and the water proofing sheet or layer 9 are secured to each other and to the pre-formed base of the saddle top by means of rubber cement which I have found allows the cushioning material to remain soft and pliable.

After the cushioning material has been applied and secured upon the base structure, a flexible top sheet of leather or other suitable material indicated at 10 is then applied upon the cushioning material. This leather sheet is cut to a shape corresponding to that of the saddle base but of somewhat greater dimensions so that said leather top sheet will extend over the cushioning material in close engagement thereon and leave a projecting marginal portion of said sheet of sufficient width to allow the same to be turned inwardly around the edges of the layers of cushioning material 8 and upon the lower marginal faces of the base structure of the saddle top as shown at 11.

After the top leather sheet 10 has thus been applied, I permanently secure the same to the base structure and the cushioning layer 8 by the line of stitching indicated at 12. A heavy coarse thread is used forming a continuous seam at a point suitably spaced inwardly from the extreme edge of the cushioning sheet 8 and extending through the parts 5 and 6 of the base structure and the inwardly turned edge of the top sheet 10. This seam thread is tightly drawn so as to compress the cushioning material 8 and produce a continuous groove or depression as indicated at 13 extending around the marginal edge of the saddle top. Beyond or outwardly of the stitching 13, the edge portion of the cushioning sheet 8 thus forms a soft, pliable bead as at 14, which is particularly advantageous adjacent to the front pommel end of the saddle, and in conjunction with the flexible base structure of the saddle top, affords maximum pliability at these points and insures a high degree of riding comfort. Another advantage of this particular construction, is due to the fact that the formation of the depression or groove 13 resulting in the outwardly curved parts of the top sheet at each side thereof, serves to protect the stitching thread 13 against undue wear and possible breakage.

After the several parts of the saddle top have been assembled and secured together in the manner above described, it may then be readily attached at its rear end to the cantle plate and at its forward end to the pommel plate. The latter, I have shown at 15 in Fig. 3 of the drawings. Of course, it is understood that the attaching rivets indicated at 16 are inserted through suitable openings provided therefor in the base of the saddle top, before the cushioning layer 8 and top sheet 10 are assembled and secured to said base. The projecting ends of the rivets may then be readily inserted through the openings in the saddle and cantle plates and clinched thereon.

In addition to a high degree of comfort which a saddle of the above construction affords to the rider, simplicity in structure and ease of assemblage of the several parts with low manufacturing cost, it will further be evident that by reason of the fact that my present invention permits of the use of a cushioning layer or sheet 8 which is exceedingly thin in comparison with cushioning materials as employed in saddle structures of the prior art, a comparatively low position of the saddle with respect to the pedals of the vehicle may be obtained. Thus, persons with short legs may be accommodated, whereas with the saddle structures of the prior art, such proper accommodation cannot be secured, even though the saddle is adjusted to its lowest position upon the vehicle frame.

From the foregoing description considered in connection with the accompanying drawing, the construction, manner of assemblage of the several parts and the various advantages of my new saddle structure will be clearly understood. While I have shown in the accompanying drawing, a particular shape or form of the saddle top, it will of course be apparent that the essential features of my present improvements, might also be readily applied in connection with saddles of various other sizes and shapes. Therefore, although I have herein specifically disclosed a preferred practical embodiment of the invention, the several detail parts thereof may be produced in various other alternative forms, and it will accordingly be understood that I reserve the privilege of resorting to all such legitimate changes therein as may be fairly incorporated within the spirit and scope of the invention as claimed.

I claim:

1. A vehicle saddle top having a base structure embodying a sheet of textile fabric and a sheet of water proofing material covering the lower face of the textile sheet and adhesively united therewith, a layer of cushioning material entirely covering the upper surface of the saddle base and extending to the extreme marginal edges thereof, a top sheet of flexible water proof material having marginal edges extending around the edges of said cushioning material and turned inwardly upon the lower face of the saddle base, and means permanently uniting said top sheet and its inwardly turned marginal edge with the saddle base and said layer of cushioning material, adjacent to the marginal edge of the latter and holding said top sheet on close confining contact upon the cushioning material.

2. A vehicle saddle top having a base structure embodying a sheet of textile fabric and a sheet of water proofing material covering the lower face of the textile sheet and adhesively united therewith, the warp threads of said textile fabric sheet extending longitudinally of the base structure, a layer of cushioning material entirely covering the upper surface of the saddle base and extending to the extreme marginal edges thereof, a top sheet of flexible water proof material having marginal edges extending around the edges of said cushioning material and turned inwardly upon the lower face of the saddle base, and means permanently uniting said top sheet and its inwardly turned marginal edge with the saddle base and said layer of cushioning material, adjacent to the marginal edge of the latter and holding said top sheet in closely confining contact upon the cushioning material.

3. A vehicle saddle top having a base structure embodying a sheet of textile fabric and a sheet of water proofing material covering the lower face of the textile sheet and adhesively united therewith, a layer of cushioning material entirely covering the upper surface of the saddle base and extending to the extreme marginal edges thereof, a top sheet of flexible water proof material having marginal edges extending around the edges of said cushioning material and turned inwardly upon the lower face of the saddle base, and a continuous line of stitching extending through said top sheet and its inwardly turned edge to permanently fix the same in relation to the base structure and said cushioning sheet at a point inwardly spaced from the extreme marginal edge of the latter, and compressing said cushioning material to form a rounded pliable bead at the edge of the saddle top beyond said line of stitching.

4. A vehicle saddle top comprising a base structure embodying a sheet of heavy canvas and a relatively thin sheet of water proofing material extending over the lower face of said canvas sheet and adhesively united therewith, the said base structure being formed under pressure in the desired outline and sectional shape of the saddle top, the warp threads of said canvas sheet extending longitudinally of said base structure, a layer of sponge rubber covering the entire upper surface of said base structure, a top sheet of flexible water proofing material covering said layer of sponge rubber and having its marginal edges inwardly turned to envelop the edges of said rubber layer and the edges of the base structure and permanently secured to the latter at a point inwardly spaced from the edges of the rubber layer to closely confine said rubber layer upon the base structure and provide a continuous cushioning bead around the marginal edge of the saddle top.

5. A method of making vehicle saddles which consists in first superimposing a sheet of water proofing material upon one side of a sheet of textile fabric with a film of glue interposed between said sheets, then molding the assembled sheets under pressure to provide a base structure of predetermined sectional form and outline shape and with the water proofing sheet constituting the lower face of the base structure, then superimposing upon said base structure a conformable layer of cushioning material extending to the extreme marginal edges of the base structure and uniting said cushioning material to the fabric sheet of the base structure with rubber cement, then applying a top sheet of water proofing material upon said cushioning material and turning the marginal edges of said top sheet around the edges of said base structure and inwardly upon the lower face thereof, and finally permanently uniting said top sheet and its inturned edge with the cushioning layer and the base structure at a point inwardly spaced from the marginal edge of the latter.

In testimony that I claim the foregoing as my invention, I have signed my name hereto.

FREDERICK MESINGER.